US011803598B2

(12) United States Patent
Spagnolo et al.

(10) Patent No.: US 11,803,598 B2
(45) Date of Patent: *Oct. 31, 2023

(54) QUERY LANGUAGE FOR SELECTING AND ADDRESSING RESOURCES

(71) Applicant: Amazon Technologies, Inc., Seattle, WA (US)

(72) Inventors: Reza Spagnolo, Berlin (DE); Simon Kroger, Berlin (DE); Florian Mathias Holzhauer, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,612

(22) Filed: Aug. 12, 2022

(65) Prior Publication Data

US 2023/0049351 A1 Feb. 16, 2023

Related U.S. Application Data

(63) Continuation of application No. 15/789,723, filed on Oct. 20, 2017, now Pat. No. 11,416,563.

(51) Int. Cl.
*G06F 16/951* (2019.01)
*H04L 47/70* (2022.01)
*G06F 16/27* (2019.01)

(52) U.S. Cl.
CPC ............ *G06F 16/951* (2019.01); *G06F 16/27* (2019.01); *H04L 47/70* (2013.01)

(58) Field of Classification Search
CPC ......... G06F 16/951; G06F 16/27; H04L 47/70
USPC ........................................................ 707/709
See application file for complete search history.

(56) References Cited

U.S. PATENT DOCUMENTS

| | | | |
|---|---|---|---|
| 6,026,388 A | 2/2000 | Liddy et al. | |
| 6,418,448 B1* | 7/2002 | Sarkar | G06F 16/972 |
| 6,601,061 B1* | 7/2003 | Holt | G06F 16/951 |
| 7,448,022 B1* | 11/2008 | Ram | G06F 9/45504 |
| | | | 717/120 |
| 7,725,496 B2* | 5/2010 | Paval | G06F 16/164 |
| | | | 707/791 |
| 7,861,289 B2 | 12/2010 | Meyer et al. | |

(Continued)

OTHER PUBLICATIONS

Alessandro Martini, "How to Automatically Tag Amazon EC2 Resources in Response to API Events", AWS Security Blog, Amazon.com, May 2016, Retrieved from URL: https://aws.amazon.com/blogs/security/how-to-automatically-tag-amazon-ec2-resources-in-response-to-api-events/, pp. 1-15.

(Continued)

*Primary Examiner* — Hanh B Thai
(74) *Attorney, Agent, or Firm* — Robert C. Kowert; Kowert, Hood, Munyon, Rankin & Goetzel, P.C.

(57) ABSTRACT

Methods, systems, and computer-readable media for a query language for selecting and addressing resources are disclosed. Records are stored in a data store. The records comprise attribute data descriptive of resources managed by a provider network. The data store is queried to select one or more records matching one or more values of the attribute data. The query is expressed using a query language. A resource group is determined based (at least in part) on the query. The resource group comprises one or more resources corresponding to the one or more records selected by the query.

20 Claims, 7 Drawing Sheets

(56) References Cited

U.S. PATENT DOCUMENTS

| | | | |
|---|---|---|---|
| 7,861,290 B2 | 12/2010 | Meyer et al. | |
| 7,865,943 B2 | 1/2011 | Hayler et al. | |
| 8,180,789 B1* | 5/2012 | Wasserman | G06F 16/242 |
| | | | 707/766 |
| 8,554,769 B1* | 10/2013 | Thakur | G06F 16/951 |
| | | | 707/735 |
| 8,600,993 B1 | 12/2013 | Gupta et al. | |
| 8,751,283 B2* | 6/2014 | Bobak | G06Q 10/06 |
| | | | 705/348 |
| 8,839,262 B2 | 9/2014 | Ripberger | |
| 8,843,561 B2 | 9/2014 | Chen et al. | |
| 9,208,233 B1* | 12/2015 | Tirumalareddy | G06F 16/951 |
| 9,329,905 B2 | 5/2016 | Garrett | |
| 9,378,065 B2* | 6/2016 | Shear | G06F 40/00 |
| 9,451,608 B2 | 9/2016 | He et al. | |
| 9,471,577 B2 | 10/2016 | Ripberger | |
| 9,477,784 B1 | 10/2016 | Bhave et al. | |
| 9,667,656 B2 | 5/2017 | Banerjee et al. | |
| 9,756,555 B2 | 9/2017 | Nagata et al. | |
| 9,792,160 B2* | 10/2017 | Shear | G06Q 10/0631 |
| 9,904,579 B2 | 2/2018 | Shear et al. | |
| 10,075,384 B2* | 9/2018 | Shear | H04L 47/70 |
| 10,187,427 B2 | 1/2019 | Banerjee et al. | |
| 10,354,292 B1 | 7/2019 | Doshi et al. | |
| 10,509,672 B2 | 12/2019 | Shear et al. | |
| 10,997,244 B2* | 5/2021 | Russell | G06F 21/56 |
| 11,093,556 B2* | 8/2021 | Li | G06F 16/367 |
| 11,416,563 B1 | 8/2022 | Spagnolo et al. | |
| 2002/0107842 A1 | 8/2002 | Biebesheimer et al. | |
| 2002/0147709 A1 | 10/2002 | Rajarajan et al. | |
| 2003/0208473 A1* | 11/2003 | Lennon | G06F 16/40 |
| 2004/0064549 A1* | 4/2004 | Brown | H04L 43/00 |
| | | | 709/224 |
| 2005/0114756 A1* | 5/2005 | Lehikoinen | G06F 16/9562 |
| | | | 715/208 |
| 2005/0165809 A1 | 7/2005 | Leymann et al. | |
| 2006/0064429 A1 | 3/2006 | Yao | |
| 2007/0185930 A1 | 8/2007 | Betz et al. | |
| 2007/0255696 A1* | 11/2007 | Desbarats | G06Q 30/02 |
| 2007/0266024 A1 | 11/2007 | Cao | |
| 2008/0071769 A1 | 3/2008 | Jagannathan | |
| 2008/0077983 A1 | 3/2008 | Meyer et al. | |
| 2008/0313728 A1 | 12/2008 | Pandrangi et al. | |
| 2009/0177301 A1 | 7/2009 | Hayes | |
| 2010/0306249 A1 | 12/2010 | Hill et al. | |
| 2010/0318511 A1* | 12/2010 | Phan | G06F 16/9024 |
| | | | 707/769 |
| 2011/0004621 A1* | 1/2011 | Kelley | G06Q 10/06 |
| | | | 707/769 |
| 2012/0137213 A1 | 5/2012 | Hayler et al. | |
| 2014/0052492 A1* | 2/2014 | Boss | G06Q 10/06375 |
| | | | 705/7.25 |
| 2014/0280952 A1* | 9/2014 | Shear | H04L 47/70 |
| | | | 709/226 |
| 2015/0009818 A1 | 1/2015 | Xiao et al. | |
| 2015/0112965 A1 | 4/2015 | Tokuda et al. | |
| 2015/0161214 A1 | 6/2015 | Kali et al. | |
| 2015/0163099 A1* | 6/2015 | Huang | H04L 12/40013 |
| | | | 370/242 |
| 2016/0034305 A1* | 2/2016 | Shear | G06F 16/285 |
| | | | 707/722 |
| 2016/0266939 A1* | 9/2016 | Shear | G06F 40/00 |
| 2016/0294870 A1 | 10/2016 | Banerjee et al. | |
| 2016/0299982 A1* | 10/2016 | Bhave | H04L 43/022 |
| 2017/0180910 A1* | 6/2017 | Foti | H04W 4/70 |
| 2017/0242667 A1 | 8/2017 | Kotman et al. | |
| 2017/0359384 A1 | 12/2017 | Banerjee et al. | |
| 2018/0089281 A1* | 3/2018 | Li | G06F 16/951 |
| 2018/0278710 A1* | 9/2018 | Sun | G06F 16/951 |
| 2019/0018904 A1* | 1/2019 | Russell | G06F 16/27 |
| 2020/0050483 A1 | 2/2020 | Shear et al. | |
| 2020/0159579 A1 | 5/2020 | Shear et al. | |

OTHER PUBLICATIONS

Jeff Barr, "New—AWS Resource Tagging API", AWS Blog, Amazon. com, Mar. 2017, Retrieved from URL: https://aws.amazon.com/blogs/aws/new-aws-resource-tagging-api/, pp. 1-8.

Jeff Barr, "Resource Groups and Tagging for AWS", AWS Blog, Amazon com, Dec. 17, 2014, Retrieved from URL: https://aws.amazon.com/blogs/aws/resource-groups-and-tagging/, pp. 1-9.

* cited by examiner

QUERY LANGUAGE FOR SELECTING AND ADDRESSING RESOURCES

This application is a continuation of U.S. patent application Ser. No. 15/789,723, filed Oct. 20, 2017, which is hereby incorporated by reference herein in its entirety.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

Figure 1:
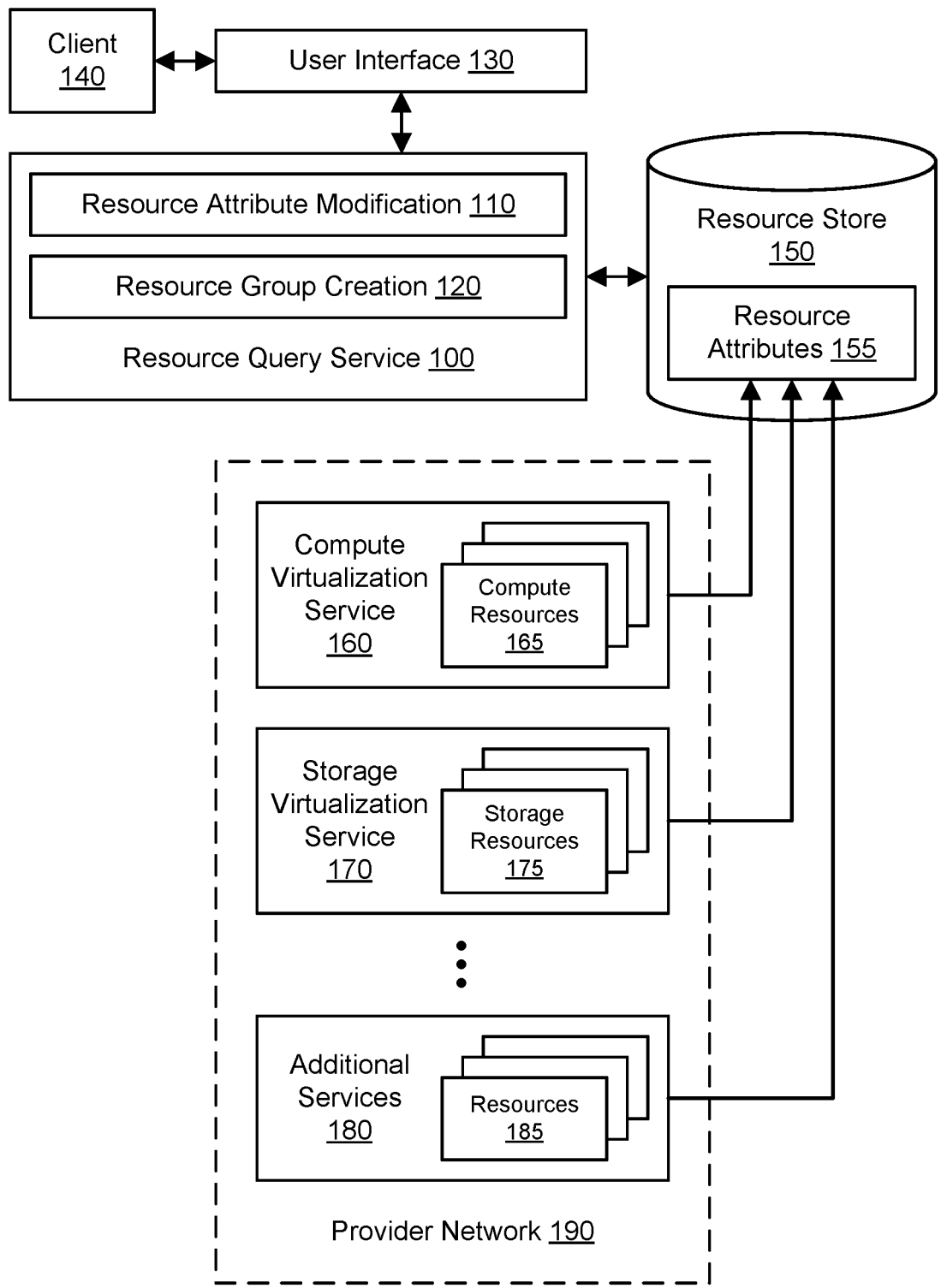
FIG. 1 illustrates an example system environment for a query language for selecting and addressing resources, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for a query language for selecting and addressing resources are described. In one embodiment, a provider network includes numerous resources of different types, and the resources may be offered for use by clients. In some embodiments, for example, the provider network may include computing resources such as virtual compute instances and storage resources such as database instances. In one embodiment, the various types of resources may be provided by various services of the provider network. In one embodiment, a query language may represent a standardized way to group the resources of the provider network. In one embodiment, using the query language, a user may specify, as search criteria, one or more user-defined attributes and/or system-defined attributes that collectively define the membership of a resource group. In one embodiment, user-defined attributes may include tags or other human-readable labels that are applied to resources by users. In one embodiment, system-defined attributes may include resource types, resource identifiers, regions or subdivisions within the provider network, hardware configurations, software configurations, status information, health information, or other resource attributes that may change without user input. In one embodiment, a query expression that represents a resource group may be stored, and the query based on the expression may be run again to identify the current membership of the resource group at a given time. In one embodiment, attributes of resources may be obtained and stored in a data store, and the data store may be queried to determine the membership of a resource group. In one embodiment, attributes of resources may be obtained using a crawler service that scans the provider network. In one embodiment, attributes of resources may be obtained based (at least in part) on event-driven notifications, e.g., when a new resource is provisioned in the provider network. In one embodiment, a resource group may be addressed to apply policies to its individual members. In one embodiment, the policies may represent management tasks, e.g., to configure the resources. In various embodiments, the query language may enable users of a provider network to easily define resource groups containing heterogeneous resources and then configure the resources in the groups.

FIG. 1 illustrates an example system environment for a query language for selecting and addressing resources, according to one embodiment. In one embodiment, a resource query service 100 may provide one or more clients, such as client 140, with the ability to create resource groups based (at least in part) on attributes 155 of resources of a provider network 190. In one embodiment, the service 100 may use a query language to query the resource attributes 155 stored in a resource store 150 and create resource groups based (at least in part) on the query results. In one embodiment, the resource store 150 may represent one or more data stores, databases, or tables that maintain data indicative of resource attributes 155. In one embodiment, the attributes 155 may be stored using records in the resource store 150, e.g., such that individual records correspond to individual resources in the provider network 190. In one embodiment, the resource store 150 may be implemented using a NoSQL data storage and retrieval service such as Amazon DynamoDB. In one embodiment, the resource store 150 may be implemented using a relational database management system.

In one embodiment, the resource attribute data 155 may describe or characterize aspects of resources of the provider network 190. In some embodiments, for example, the resource attributes 155 may include descriptive alphanumeric tags (e.g., as defined by users), resource identifiers, resource type information, resource region information, resource location information, resource health information, resource status information, resource usage metrics, and so on. In one embodiment, the resource query service 100 may include a component for resource attribute modification 110. In one embodiment, the resource attribute modification 110 may create, update, or delete aspects of the resource attribute data 155 maintained by the resource store 150. In one embodiment, the resource query service 100 may include a component for resource group creation 120. In one embodiment, the resource group creation component 120 may query the resource store 150 and determine the membership of a resource group based (at least in part) on the results of the query.

In one embodiment, a client 140 may employ a user interface 130 to interact with the service 100. In one embodiment, the user interface 130 may include a graphical user interface (GUI), a command-line interface (CLI), and so on. In one embodiment, a client 140 (e.g., a user of a client computing device 140) may use the user interface 140 to supply search criteria in the form of particular values of resource attributes. In one embodiment, the resource query service 100 may generate output such as a report or visualization of the resulting resource group to be presented to the user in the user interface 130. In one embodiment, the user interface 130 may represent a management console associated with a control plane. In one embodiment, the management console may permit the client 140 to manage the resource query service 100. In one embodiment, the management console may permit the client 140 to manage other services (e.g., of the provider network 190) in addition to the resource query service 100. In one embodiment, the user interface 130 may communicate with the resource query service 100 using one or more application programming interfaces (APIs) and/or other programmatic interfaces.

In one embodiment, the query language used by the service 100 may represent a standardized way to group resources of a provider network 190. In some embodiments, resources that are subject to queries using the query language may include computing resources 165 such as virtual compute instances that are provided by a compute virtualization service 160 of the provider network 190 and/or physical compute instances of the provider network 190. In some embodiments, resources that are subject to queries using the query language may include storage resources 175 such as storage instances and storage units that are provided by one or more storage virtualization services 170 of the provider network 190. In some embodiments, other types of resources 185 may be provided by additional services 180 of the provider network 190. In some embodiments, resources that are subject to queries using the query language may include queues, virtual private clouds (VPCs), managed compute environments, stacks of resources, load balancers, security groups, snapshots of compute instances, volumes, clusters, cache clusters, vaults, streams, database instances, snapshots of database instances, storage buckets, and other user-account-specific components that are provided by services of the provider network 190. In some embodiments, resources that are subject to queries may exist across different services, regions, and/or accounts of the provider network 190. In one embodiment, queryable resources may be hosted and managed by the provider network 190. In one embodiment, queryable resources may be hosted outside of the provider network 190 (e.g., on client premises) but may be managed by the provider network, e.g., using agent software installed on the resources. In some embodiments, the resource query service 100, user interface 130, and/or resource store 150 may be hosted and/or managed by the provider network 190.

In one embodiment, the provider network 190 may represent a network set up by an entity such as a private-sector company or a public-sector organization to provide one or more services (such as various types of network-accessible computing or storage) accessible via the Internet and/or other networks to a distributed set of clients. In one embodiment, the provider network 190 may include numerous services that collaborate according to a service-oriented architecture to provide the resources 165, 175, and 185. In one embodiment, the provider network 190 may include numerous data centers hosting various resource pools, such as collections of physical and/or virtualized computer servers, storage devices, networking equipment and the like, that are used to implement and distribute the infrastructure and services offered by the provider. In one embodiment, the compute resources 165 may, in some embodiments, be offered to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In one embodiment, a number of different types of computing devices may be used singly or in combination to implement the resources of the provider network 190, including general purpose or special purpose computer servers, storage devices, network devices, and the like. In one embodiment, a service of the provider network 190 may be implemented using a plurality of different instances that are distributed throughout one or more networks, and each instance may offer access to the functionality of the corresponding service to various clients. In one embodiment, because resources of the provider network 190 may be under the control of multiple clients (or tenants) simultaneously, the provider network may be said to offer multi-tenancy and may be termed a multi-tenant provider network.

In one embodiment, the functionality of the provider network 190 may be offered to the client(s) 140 in exchange for fees. In some embodiments, an operator of the provider network 190 may implement a flexible set of resource reservation, control, and access interfaces for their clients. In one embodiment, for example, a resource manager may implement a programmatic resource reservation interface (e.g., via a web site or a set of web pages) that allows clients (potentially including other components within the provider network) to learn about, select, purchase access to, and/or reserve compute instances 165 offered by the provider network 190. In one embodiment, such an interface may include capabilities to allow browsing of a resource catalog and provide details and specifications of the different types or sizes of resources supported, the different reservation types or modes supported, pricing models, and so on.

In one embodiment, the provider network 190 may support several different purchasing modes (which may also be referred to herein as reservation modes) such as long-term reservations, on-demand resource allocation, or spot-price-based resource allocation. In one embodiment, using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. In one embodiment, using on-demand mode, a client could pay for capacity by the hour (or some appropriate time unit), without any long-term commitments or upfront payments. In one embodiment, in the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. In one embodiment, during periods when the supply of the requested resource type exceeds the demand, the spot price may become significantly lower than the price for on-demand mode. In some embodiments, if the spot price increases beyond the maximum bid specified by a client, a resource allocation may be interrupted: i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 7:
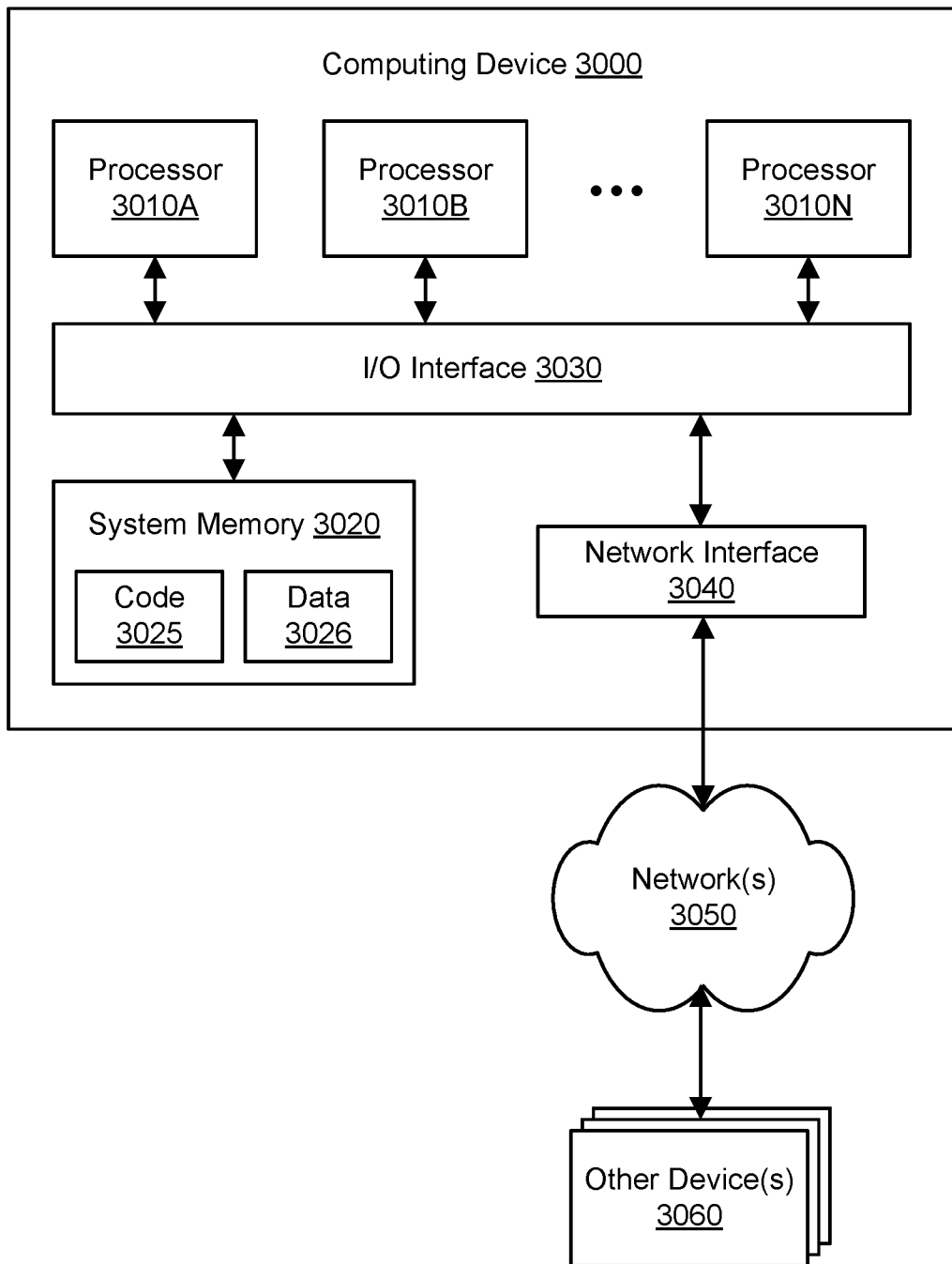
FIG. 7 illustrates an example computing device that may be used in some embodiments.

In one embodiment, the resource query service 100 may be implemented using any suitable number and configuration of computing devices, any of which may be implemented by the example computing device 3000 illustrated in FIG. 7. In some embodiments, the computing devices may be located in any suitable number of data centers or geographical locations. In various embodiments, at least some of the functionality of the service 100 may be provided by the same computing device or by different computing devices. In various embodiments, if any of the components of the service 100 are implemented using different computing devices, then the components and their respective computing devices may be communicatively coupled, e.g., via one or more networks. In one embodiment, any of the components of the service 100 (e.g., the resource attribute modification component 110 and resource group creation component 120) may represent any combination of software and hardware usable to perform their respective functions. In some embodiments, operations implemented by the service 100 may be performed automatically, e.g., without a need for user initiation or user intervention after an initial configuration stage, and/or programmatically, e.g., by execution of program instructions on at least one computing device. In some embodiments, the service 100 may include additional components not shown, fewer components than shown, or different combinations, configurations, or quantities of the components shown.

In one embodiment, clients of the service 100 (such as client 140) may represent external devices, systems, or entities with respect to the service 100. In one embodiment, the client device(s) may be implemented using any suitable number and configuration of computing devices, any of which may be implemented by the example computing device 3000 illustrated in FIG. 7. In one embodiment, client(s) may convey network-based service requests to the service 100 via one or more networks, e.g., to supply the search criteria for resource queries. In various embodiments, the network(s) may encompass any suitable combination of networking hardware and protocols necessary to establish network-based communications between client device(s) 140 and the service 100. In one embodiment, for example, the network(s) may generally encompass the various telecommunications networks and service providers that collectively implement the Internet. In one embodiment, the network(s) may also include private networks such as local area networks (LANs) or wide area networks (WANs) as well as public or private wireless networks. In one embodiment, for example, both a given client device and the service 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the service 100. In one embodiment, client device(s) 140 may communicate with the service 100 using a private network rather than the public Internet. In various embodiments, the service 100 may also communicate with other components of the provider network 190 (e.g., the services 160, 170, and 180) using one or more network interconnects.

Figure 2:
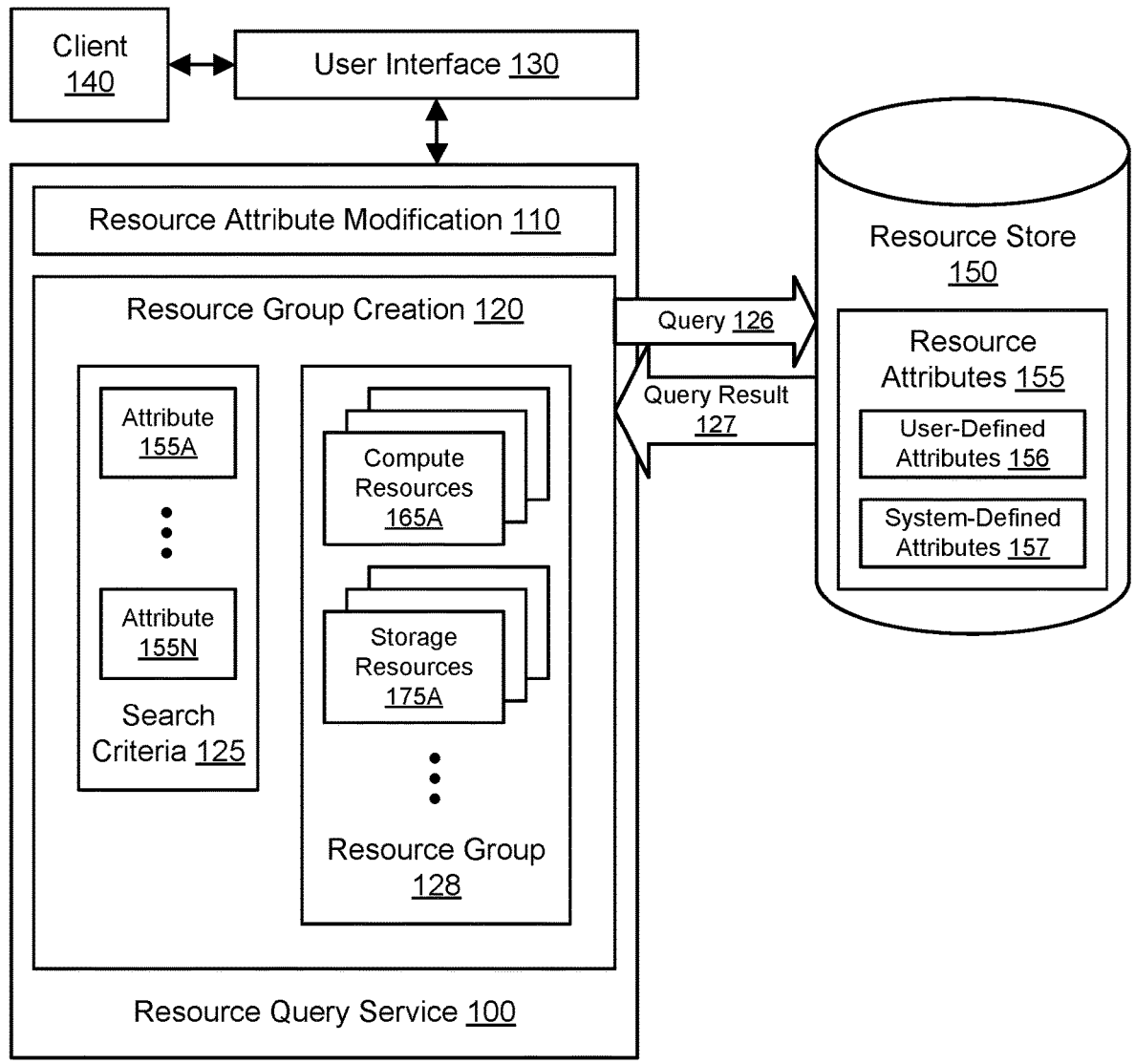
FIG. 2 illustrates further aspects of the example system environment for query language for selecting and addressing resources, including creation of a resource group that matches search criteria for attributes, according to one embodiment.

FIG. 2 illustrates further aspects of the example system environment for query language for selecting and addressing resources, including creation of a resource group that matches search criteria for attributes, according to one embodiment. In one embodiment, a resource group 128 can be created by using a query expression 126 that specifies, as search criteria 125, values of one or more attributes 155A-155N that collectively define the membership of the group. In some embodiments, the search criteria 125 may also be referred to as selection criteria, filter criteria, or search terms. In some embodiments, the resource attributes 155 maintained in the resource store 150 may include user-defined attributes 156 and/or system-defined attributes 157, and the search criteria 125 may specify values for both user-defined attributes and system-defined attributes. In some embodiments, user-defined attributes 156 may include tags or other human-readable labels that are applied to resources by users. In some embodiments, system-defined attributes 157 may include resource types, resource identifiers, regions or subdivisions within the provider network, physical or geographical locations, hardware configurations, software configurations, status information, health information, or other static or dynamic resource attributes that may be defined or changed without user input from the client 140. In one embodiment, a query expression that represents a resource group may be stored, and the query based on the expression may be run again against the resources of the provider network 190 to identify the current membership of the resource group at a given time. In one embodiment, the results 127 of a query may include a list of resource identifiers in a structured format, e.g., according to JavaScript Object Notation (JSON).

In one embodiment, the resources in a resource group may be heterogeneous in terms of their type. In one embodiment, for example, the resource group 128 created from the query result 127 may include both compute resources 165A and storage resources 175A. In one embodiment, the compute resources 165A may represent a subset of the compute resources 165 managed by the compute virtualization service 160. In one embodiment, the storage resources 175A may represent a subset of the storage resources 175 managed by the storage virtualization service 170. In one embodiment, the compute resources 165A and storage resources 175A may be associated with the account of the client 140 (e.g., are "owned" by that client) and not with accounts of other clients of the provider network 190. In one embodiment, a resource group may be defined by a name, a description, and search criteria associated with a query. In one embodiment, the resource group 128 may be stored persistently. In one embodiment, the resource group 128 may not be stored persistently and may be discarded after information regarding the group is presented to the user 140, e.g., as search results of the search criteria 125.

In one embodiment, the query language in which the query 126 is expressed may have a similar syntax to Structured Query Language (SQL). In one embodiment, the query language may include Boolean operators such as AND, OR, and NOT to allow users to construct complex queries. In one embodiment, for example, the expression "resourceType=VirtualComputeInstance AND tag:env=prod AND region=us-east-1 AND attribute:vpc-id=vpc-1234567" may define a resource group of virtual compute instances that are tagged as being part of a production environment and that are located in the region us-east-1 and that belong to a particular Virtual Private Cloud. In one embodiment, as another example, a query expression may specify virtual compute instances that are online and also storage buckets that are larger than 1 GB. In one embodiment, a particular query may be limited to resources that are associated with one or more user accounts with the provider network, e.g., such that the query results include only resources owned by the same account from which the query originates. In one embodiment, a query expression may be left blank to return all resources associated with a particular account. In one embodiment, a particular resource can belong to multiple resource groups. In one embodiment, resource groups may themselves be resources that can be queried using the query language, and one resource group may contain one or more other resource groups. In some embodiments, query expressions may include grouping operators such as parentheses and/or comparison operators such as =(equality), !=(inequality), =^(prefix matching), and IN( ) (list membership matching that returns true if the operand is contained within the specified list).

In one embodiment, the query language of the query 126 may allow users to define multi-level group hierarchies that reflect actual relationships between their application components, software projects, business units, or cost centers. In one embodiment, users may create closed groups by selecting individual resources and adding those resources to either a new or an existing resource group. In one embodiment, a public application programming interface (API) associated with the resource query service 100 may give users the ability to maintain a single group context across multiple service consoles within the provider network 190. In one embodiment, using the query language, a user can determine if a set of compute instances and a set of database tables are a part of the same application, e.g., as shown in resource group 128. In one embodiment, using the query language, users can interact with groups directly rather than with individual resources. In one embodiment, users can give additional meaning to resource groups by adding custom attributes to which they can later apply a group policy.

In one embodiment, the query 126 may be run at different times. In one embodiment, the query result 127 may be stored, and the stored result may be compared against a current result when the query 126 is run again. In one embodiment, the new query result may indicate a modification to the membership of the resource group 128, e.g., such that one or more new resources may be added to the group and/or one or more existing resources may be removed from the group. In one embodiment, any differences in the membership in the resource group may be communicated to the client 140, e.g., with the user interface 130. In one embodiment, the client 140 may register an interest in receiving notifications about a change in resource group membership for a particular query. In one embodiment, automatic notifications about resource group changes may enable clients to manage their resources more efficiently. In some embodiments, the resource group 128 may be displayed in the user interface 130 as a list or set of attributes of resources in the group, along with a name and/or description of the group. In some embodiments, the resource group 128 may be displayed in the user interface 130 as a visualization of relationships between resources, again to enable clients to manage their resources more efficiently. In one embodiment, metrics regarding the resource group 128 may be displayed in the user interface 130. In one embodiment, the type of metrics displayed may vary based (at least in part) on the type of resources in the resource group 128.

In some embodiments, the resource query service 100 may implement functionality for defining queries, performing queries, displaying results of queries with a user interface 130, applying policies to resource groups determined by queries, and/or interacting with other services of the provider network 190 (e.g., to apply policies to resource groups using the other services). In some embodiments, the resource query service 100 may offer API operations such as CreateGroup, UpdateGroup, ListGroups, GetGroup, DeleteGroup, UpdateGroupQuery, GetGroupQuery, AddTags, ListTags, DeleteTags, ListGroupIdentifiers, ListGroupResources, and so on.

In one embodiment, the syntax for a CreateGroup request may be expressed according to the following JSON format, where the ResourceQuery element determines which resources can be members of the group, and the Tags element(s) are optional tags to add to the resource group:

```
POST/groups HTTP/1.1
Content-type: application/json
{
   "Name": "string",
   "Description": "string",
   "ResourceQuery": {
      "QueryLanguage": "string",
      "Query": "string"
   },
   Tags: {
      "key1": "value1",
      "keyN": "valueN"
   }
}
```

In one embodiment, the syntax for a response to a CreateGroup request may be expressed according to the following JSON format:

```
HTTP/1.1 200
Content-type: application/json
{
  "Group": {
    "GroupId": "string",
    "GroupResourceName": "string",
    "Name": "string",
    "Description": "string",
    "RefreshedAt": "timestamp-as-iso-8601-string"
  },
  "ResourceQuery": {
    "QueryLanguage": "string",
    "Query": "string"
  },
  "Tags": {
    "key1": "value1",
    "keyN": "valueN"
  }
}
```

In one embodiment, the syntax for an UpdateGroup request may be expressed according to the following JSON format, where the group-id of the resource group to be updated exists within the account of the caller:

```
PUT /groups/$group-id HTTP/1.1
Content-type: application/json
{
  "Name": "string",
  "Description": "string"
}
```

In one embodiment, the syntax for a response to an UpdateGroup request may be expressed according to the following JSON format:

```
HTTP/1.1 200
Content-type: application/json
{
  "GroupId": "string",
  "GroupResourceName": "string",
  "Name": "string",
  "Description": "string",
  "RefreshedAt": "timestamp-as-iso-8601-string"
}
```

In one embodiment, the syntax for a ListGroup request may be expressed according to the following JSON format in order to return a list of existing resource groups associated with the caller:

GET /groups?maxResults=number&nextToken=string HTTP/1.1
Content-type: application/json In one embodiment, the syntax for a response to a ListGroup request may be expressed according to the following JSON format:

```
HTTP/1.1 200
Content-type: application/json
{
  "Groups": [
    {
      "GroupId": "string",
      "GroupResourceName": "string",
      "Name": "string",
      "Description": "string",
      "Status": "string",
      "RefreshedAt": "timestamp-as-iso-8601-string"
    }
  ],
  "NextToken": "string"
}
```

In one embodiment, the syntax for a GetGroup request may be expressed according to the following JSON format in order to return information for a specific resource group associated with the caller:

GET /groups/$group-id HTTP/1.1
Content-type: application/json

In one embodiment, the syntax for a response to a GetGroup request may be expressed according to the following JSON format:

```
HTTP/1.1 200
Content-type: application/json
{
  "GroupId": "string",
  "GroupResourceName": "string",
  "Name": "string",
  "Description": "string",
  "Status": "string",
  "RefreshedAt": "timestamp-as-iso-8601-string"
}
```

In one embodiment, the syntax for a DeleteGroup request may be expressed according to the following JSON format:

DELETE /groups/$group-id HTTP/1.1
Content-type: application/json

In one embodiment, the syntax for a response to a DeleteGroup request may be expressed according to the following JSON format:

```
HTTP/1.1 200
Content-type: application/json
{
  "GroupId": "string",
  "GroupResourceName": "string",
  "Name": "string",
  "Description": "string",
  "Status": "string",
  "RefreshedAt": "timestamp-as-iso-8601-string"
}
```

In one embodiment, the syntax for an UpdateGroupQuery request may be expressed according to the following JSON format, where the ResourceQuery element determines which resources can be members of the group:

```
PUT /groups/$group-id/query HTTP/1.1
Content-type: application/json
{
  "ResourceQuery": {
    "QueryLanguage": "string",
    "Query": "string"
  }
}
```

In one embodiment, the syntax for a response to an UpdateGroupQuery request may be expressed according to the following JSON format:

```
HTTP/1.1 200
Content-type: application/json
{
  "GroupId": "string",
  "ResourceQuery": {
    "QueryLanguage": "string",
    "Query": "string"
  }
}
```

In one embodiment, the syntax for a GetGroupQuery request may be expressed according to the following JSON format, where the ResourceQuery element determines which resources can be members of the group:

GET/groups/$group-id/query HTTP/1.1
Content-type: application/json

In one embodiment, the syntax for a response to a GetGroupQuery request may be expressed according to the following JSON format:

```
HTTP/1.1 200
Content-type: application/json
{
  "GroupId": "string",
  "ResourceQuery": {
    "QueryLanguage": "string",
    "Query": "string"
  }
}
```

In one embodiment, the syntax for an AddTags request may be expressed according to the following JSON format to add the specified tags to a particular resource name:

```
POST /tags/$resource-name HTTP/1.1
Content-type: application/json
{
  "Tags": {
    "key1": "value1",
    "keyN": "valueN"
  }
}
```

In one embodiment, the syntax for a response to an AddTags request may be expressed according to the following JSON format:

```
HTTP/1.1 200
Content-type: application/json
{
  "ResourceName": "string",
  "Tags": {
    "key1": "value1",
    "keyN": "valueN"
  }
}
```

In one embodiment, the syntax for a ListTags request may be expressed according to the following JSON format to return the list of tags associated with a particular resource name:

GET/tags/$resource-name HTTP/1.1
Content-type: application/json

In one embodiment, the syntax for a response to a ListTags request may be expressed according to the following JSON format:

```
HTTP/1.1 200
Content-type: application/json
{
  "ResourceName": "string",
  "Tags": {
    "key1": "value1",
    "keyN": "valueN"
  }
}
```

In one embodiment, the syntax for a DeleteTags request may be expressed according to the following JSON format to delete the specified tags from a particular resource name:

```
DELETE /tags/$resource-name HTTP/1.1
Content-type: application/json
{
  "Keys": [ "string" ]
}
```

In one embodiment, the syntax for a response to a DeleteTags request may be expressed according to the following JSON format:

```
HTTP/1.1
Content-type: application/json
{
  "ResourceName": "string",
  "Keys": [ "string" ]
}
```

In one embodiment, the syntax for a ListGroupIdentifiers request may be expressed according to the following JSON format to return a list of resource names or identifiers that are members of a specified resource group:

GET/groups/$group-id/identifiers?maxResults=number&nextToken=string HTTP/1.1
Content-type: application/json In one embodiment, the syntax for a response to a ListGroupIdentifiers request may be expressed according to the following JSON format:

```
HTTP/1.1 200
Content-type: application/json
{
  "ResourceIdentifiers": [
    {
      "ResourceName": "string",
      "ResourceType": "string",
      "ObservedAt": "timestamp-as-iso-8601-string"
    }
  ],
  "NextToken": "string"
}
```

In one embodiment, the syntax for a ListGroupResources request may be expressed according to the following JSON format to return a paginated list of attributes associated with the members of a specified resource group:

GET/groups/$group-id/resources?maxResults=number&nextToken=string HTTP/1.1
Content-type: application/json In one embodiment, the syntax for a response to a ListGroupResources request may be expressed according to the following JSON format:

```
HTTP/1.1 200
Content-type: application/json
{
  "Resources": [
    {
      "ResourceName": "string",
      "ResourceType": "string",
      "ObservedAt": "timestamp-as-iso-8601-string"
      "Attributes": {
        "AttrKey1": "AttrValue1",
        "AttrKeyN": "AttrValueN"
      },
      "Tags": {
        "key1": "value1",
        "keyN": "valueN"
      }
    }
  ],
  "NextToken": "string"
}
```

In one embodiment, a query 126 may be performed using a query language by which query expressions are formatted. In one embodiment, a query 126 may include one or more whitespace-separated expressions, with each expression defining one or more criteria for selecting matching resources according to their attributes or tags. In one embodiment, a query expression may be formatted according to the following syntax: ($resource-type ($attribute eq $value) ($tag:key eq $tag:value)). In some embodiments, the query language may support any of the following comparison operators: eq (equal), ne (not equal), in (within the given collection of values), le (less than or equal), It (less than), ge (greater than or equal), gt (greater than), between (within or equal to the given boundaries), not_null (has a non-null value or, in the case of tags, simply exists), null (has a null value or, in the case of tags, does not exist), contains (contains the given substring), not_contains (does not contain the given substring), and begins_with (begins with the given substring). In one embodiment, for example, a query expression that identifies all running virtual compute instances with tag "Environment: Production" in the customer account may look like: (ProviderNetworkName::ComputeVirtualizationService::Instance (status eq "running") (tag:"Environment" eq "Production")). In one embodiment, as another example, multiple expressions can be combined to create queries that span across multiple resource types, such as by adding also all database instances with status available and which have the same tags as the compute instances: (ProviderNetworkName::ComputeVirtualizationService::Instance (status eq "running") (tag:"Environment" eq "Production")) (ProviderNetworkName::DatabaseService::DBInstance (status eq "available") (tag: "Environment" eq "Production")).

Figure 3:
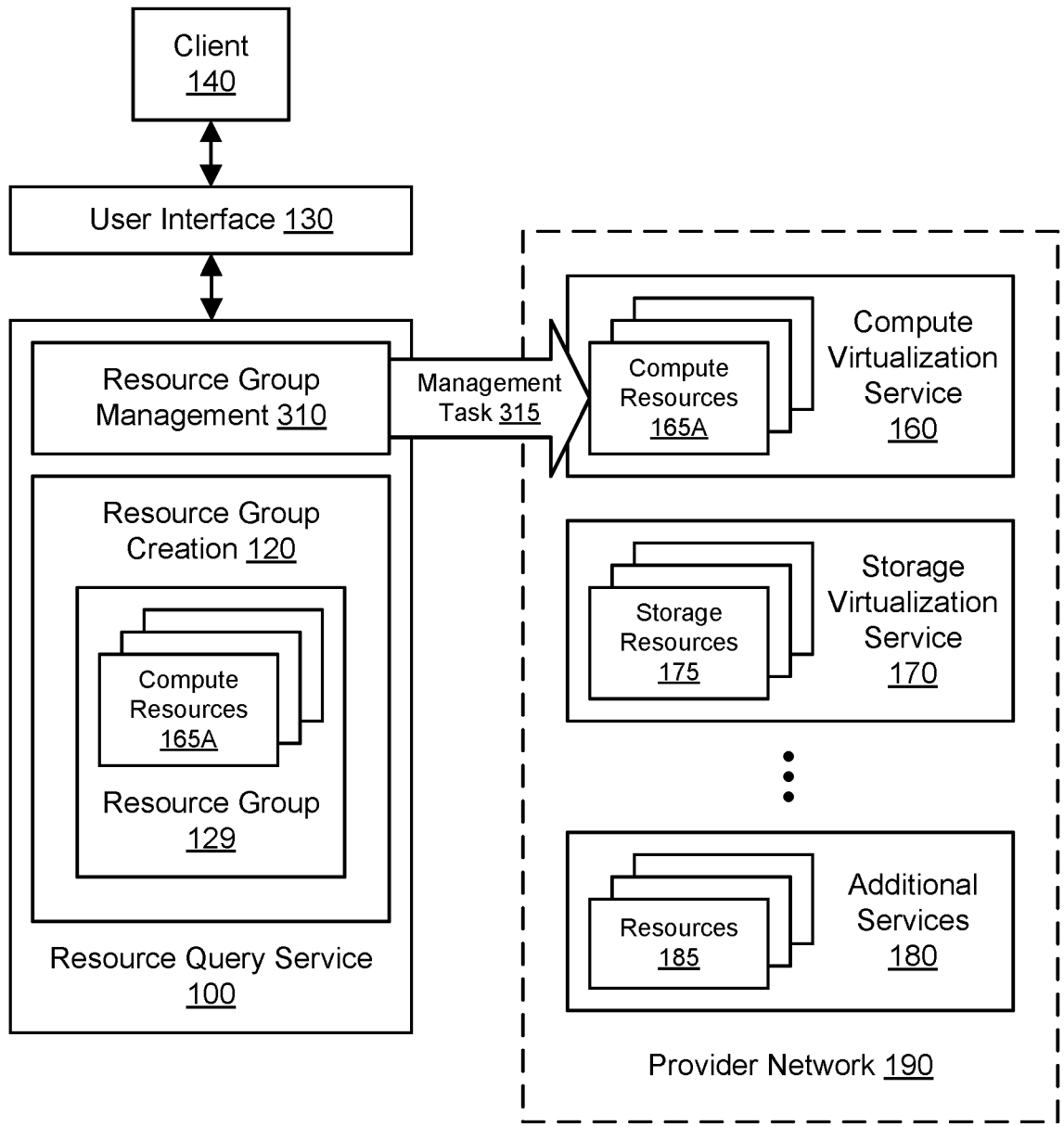
FIG. 3 illustrates further aspects of the example system environment for query language for selecting and addressing resources, including performing a management task on a resource group, according to one embodiment.

FIG. 3 illustrates further aspects of the example system environment for query language for selecting and addressing resources, including performing a management task on a resource group, according to one embodiment. In one embodiment, the resource query service 100 may include a component for resource group management 310. In one embodiment, using the resource group management 310, users may apply policies to resource groups that are defined using the query language. In one embodiment, policies may represent tasks or commands, e.g., to manage and/or configure resources. In one embodiment, as shown in FIG. 3, a resource group 129 may include particular compute resources 165A, and the resource query service 100 may enable the client 140 to perform a management task 315 with respect to those resources in the actual provider network 190. In some embodiments, for example, the management task 315 may configure the resources 165A to install software, attach a storage resource, change a security policy, and so on. In one embodiment, the management task 315 may be implemented using various services of the provider network 190, such as the compute virtualization service 160.

In one embodiment, the policies may be defined and/or applied using one or more management consoles of the provider network 190, e.g., as represented by the user interface 130. In some embodiments, for example, policies may be defined and applied using a console 130 associated with the service 100 and/or with consoles associated with other services of the provider network 190. In one embodiment, the console 130 may present information about the individual resources in a resource group, such as their user-defined attributes and system-defined attributes. In one embodiment, the console 130 may present information about the resource group itself, such as a name of the group, a description of the group, an indication of the search criteria associated with the group, and so on. In one embodiment, the resource attributes displayed in the console 130 may be determined by a component that receives a resource identifier as input and returns a list of attributes associated with that resource identifier. In one embodiment, the console 130 may permit a user to add custom group attributes to a resource group such that policies can be applied based on those attributes. In one embodiment, for example, a user can apply a policy to enable gathering of usage metrics on particular groups in a production environment. In one embodiment, as another example, a user can define a policy that determines whether compute instances in a particular resource group can be rebooted through a compute virtualization service 160.

In one embodiment, the management task 315 may be selected from a menu of tasks presented to the client 140 in the user interface 130. In one embodiment, the menu of tasks may be restricted to tasks that are relevant to the resource type(s) in the resource group 129. In one embodiment, for example, if the resource group 129 includes only virtual compute instances 165A, then the menu of tasks may include one or more selectable tasks for managing virtual compute instances and exclude other tasks for managing other types of resources. In various embodiments, the management tasks supported for resource groups may include resource management, service automation, capacity planning, security, and so on.

Figure 4:
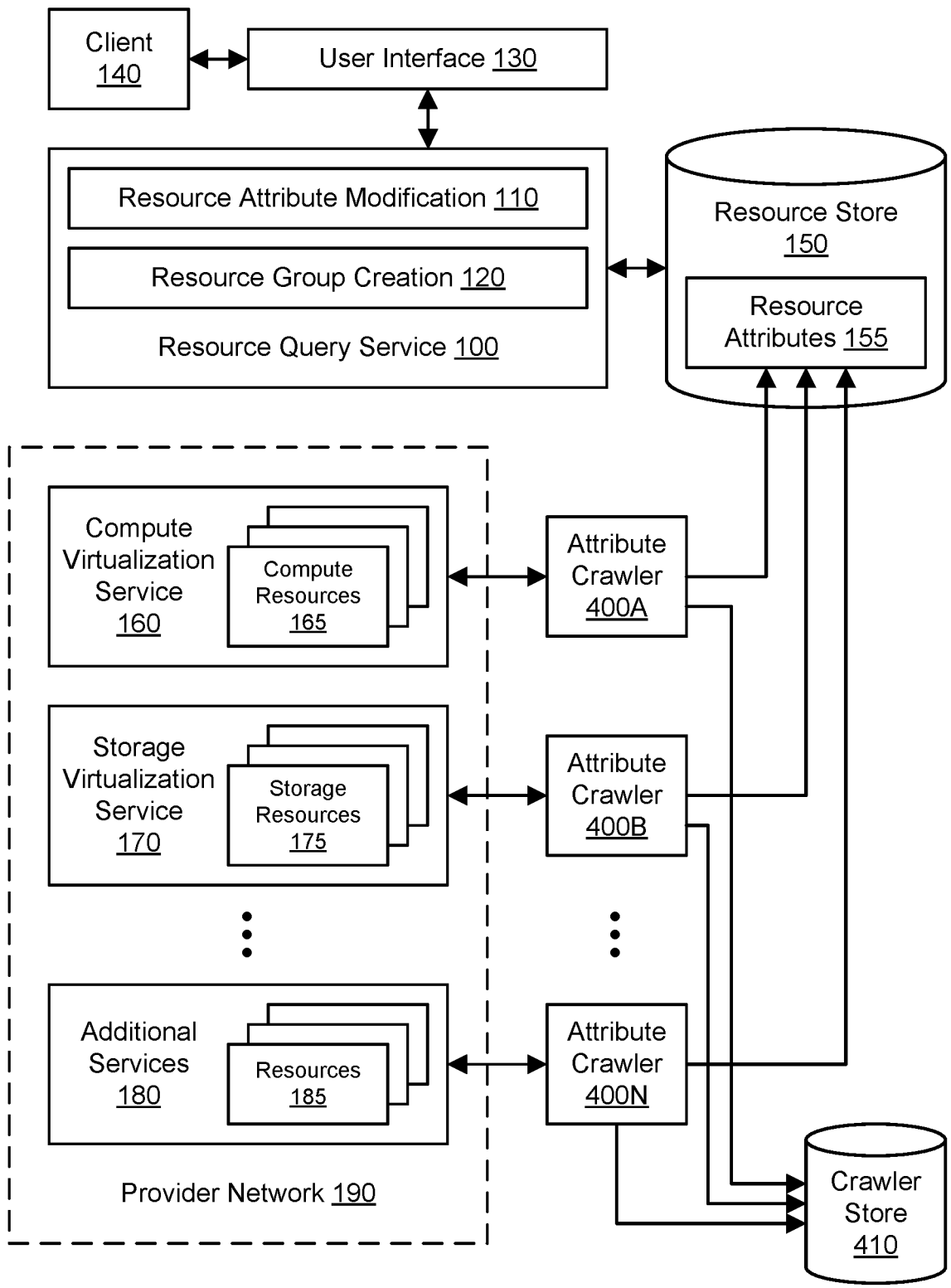
FIG. 4 illustrates further aspects of the example system environment for query language for selecting and addressing resources, including the use of crawlers to obtain resource attributes, according to one embodiment.

FIG. 4 illustrates further aspects of the example system environment for query language for selecting and addressing resources, including the use of crawlers to obtain resource attributes, according to one embodiment. In one embodiment, attribute crawlers 400A-400N may be used to obtain the resource attributes in an asynchronous manner. In one embodiment, a crawler service including components such as crawlers 400A and 400B through 400N may operate throughout the provider network 190 to detect newly provisioned resources and changes in resource attributes. In one embodiment, any of the crawlers 400A-400N may be implemented using the example computing device 3000 shown in FIG. 7. In one embodiment, the crawlers 400A-400N may represent worker nodes whose activities are coordinated by a master node. In some embodiments, for example, the master node may provision and deprovision worker nodes, instruct individual worker nodes to begin or suspend operations, assign sets of resources to individual worker nodes for attribute scanning, and so on. In one embodiment, the crawlers 400A-400N may obtain the attribute data 155 and store it in the resource store 140.

In one embodiment, the crawlers 400A-400N may update a crawler data store 410 with information regarding the operation of the crawlers. In one embodiment, for example, the crawlers 400A-400N may update the crawler data store 410 to indicate when particular resources were last scanned for attribute data. In one embodiment, the crawler store 410 may indicate the relative priority of particular resources. In one embodiment, the crawler store 410 may indicate the number of times that a particular resource has been scanned for attribute data. In one embodiment, the crawler store 410 may be implemented using a NoSQL data storage and retrieval service such as Amazon DynamoDB. In one embodiment, the crawler store 410 may be implemented using a relational database management system.

In one embodiment, the crawlers 400A-400N may obtain attribute data by interacting with the respective services 160, 170, and 180 and/or with services that monitor usage metrics and other status information for the resources. In one embodiment, for example, the crawler 400A may ask the compute virtualization service 160 for health and status information regarding the compute resources 165. In one embodiment, the crawlers 400A-400N may scan attribute data on a regular and periodic basis with respect to particular resources of the provider network 190. In one embodiment, different resources of the provider network 190 may be scanned by the crawlers 400A-400N with different frequencies. In one embodiment, the frequency at which a resource is scanned by the crawlers 400A-400N may vary based (at least in part) on the frequency of activity of the corresponding client account. In one embodiment, for example, a very active client account may have its resources scanned more frequently by the crawlers 400A-400N than a less active client account. In one embodiment, activity may be associated with the amount or frequency of API requests to access the corresponding resource. In one embodiment, the scanning frequency for various client accounts and/or sets of resources may be maintained in the crawler data store 410.

In one embodiment, to ensure that high priority targets get crawled first while ensuring that all targets get eventually crawled, target resources may be sorted by a value calculated using the following formula: (CurrentTime−CrawledAtTime)*Priority. In one embodiment, the formula may prefer the priority value for small intervals of time since the last crawl while ensuring that eventually, while the time interval component grows, targets that have not been crawled for a long time will get picked up among the high priority targets. In one embodiment, crawl priority may be managed such that priority is initialized at a maximum value M, priority is considered decayed by a value D every minute since the last touch operation occurred, priority decays by a value S upon crawl success, priority decays by a value F (where F<<S) upon crawl failure, and priority never goes below a minimum value m.

Figure 5:
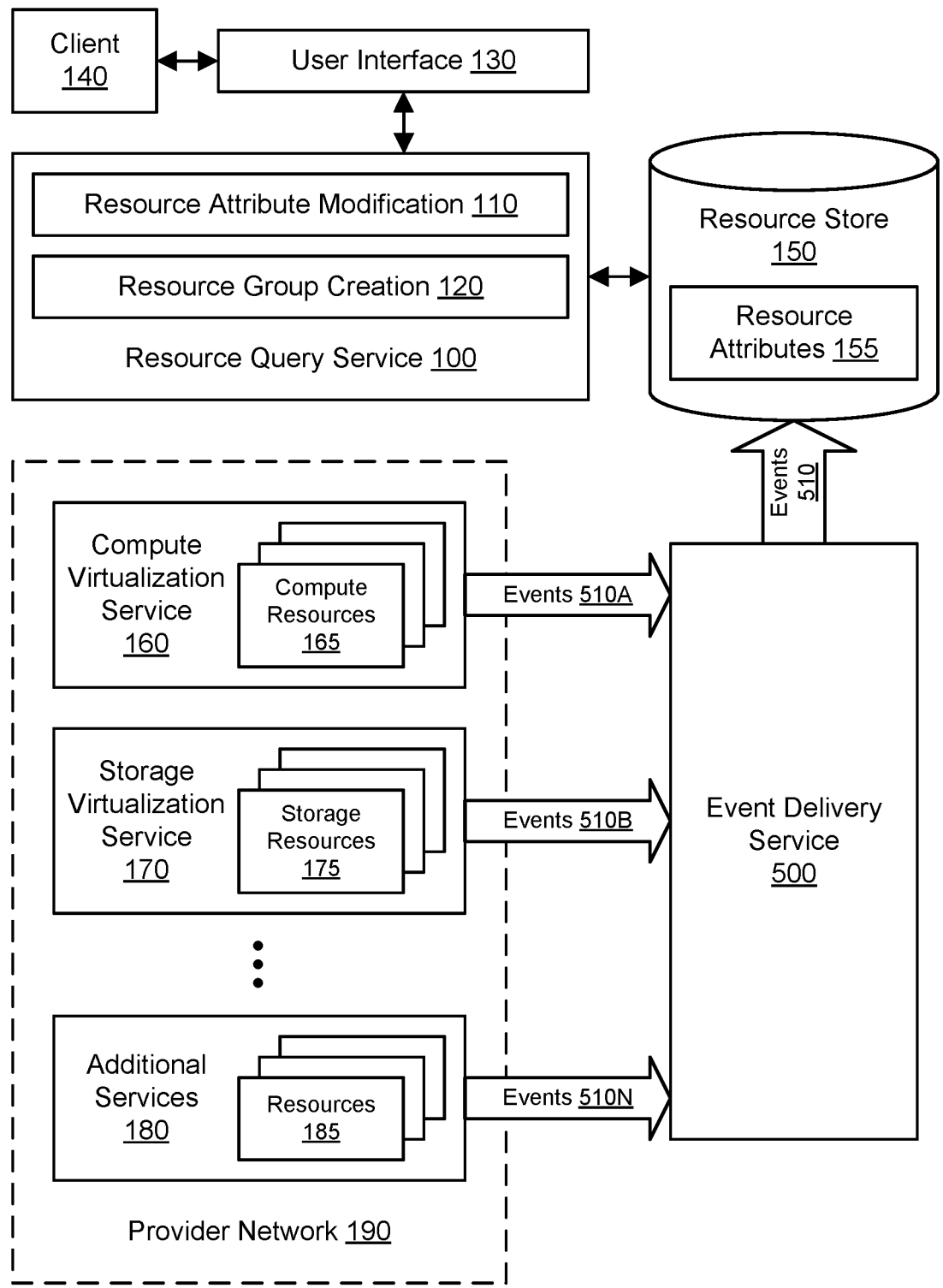
FIG. 5 illustrates further aspects of the example system environment for query language for selecting and addressing resources, including the use of event-driven notifications to obtain resource attributes, according to one embodiment.

FIG. 5 illustrates further aspects of the example system environment for query language for selecting and addressing resources, including the use of event-driven notifications to obtain resource attributes, according to one embodiment. In one embodiment, an event delivery service 500 may deliver events 510, also referred to as event-driven notifications, to the resource store 150. In one embodiment, the event delivery service 500 may deliver events 510 in an event stream, and the resource store 150 (or an associated component) may listen to the stream for relevant events. In one embodiment, the events 510 may be generated by the various services 160, 170, and 180 that host and/or manage the respective resources 165, 175, and 185. In one embodiment, the compute virtualization service 160 may generate events 510A indicating changes in attribute data or new attribute data for the compute resources 165, the storage virtualization service 170 may generate events 510B indicating changes in attribute data or new attribute data for the storage resources 175, and the additional services 180 may generate events 510N indicating changes in attribute data or new attribute data for the other resources 185. In one embodiment, for example, the compute virtualization service 160 may generate an event when a virtual compute instance is provisioned or deprovisioned so that the resource attribute data 155 can be updated accordingly. In various embodiments, the event-driven notifications may be used in conjunction with or in place of the crawler service.

Figure 6:
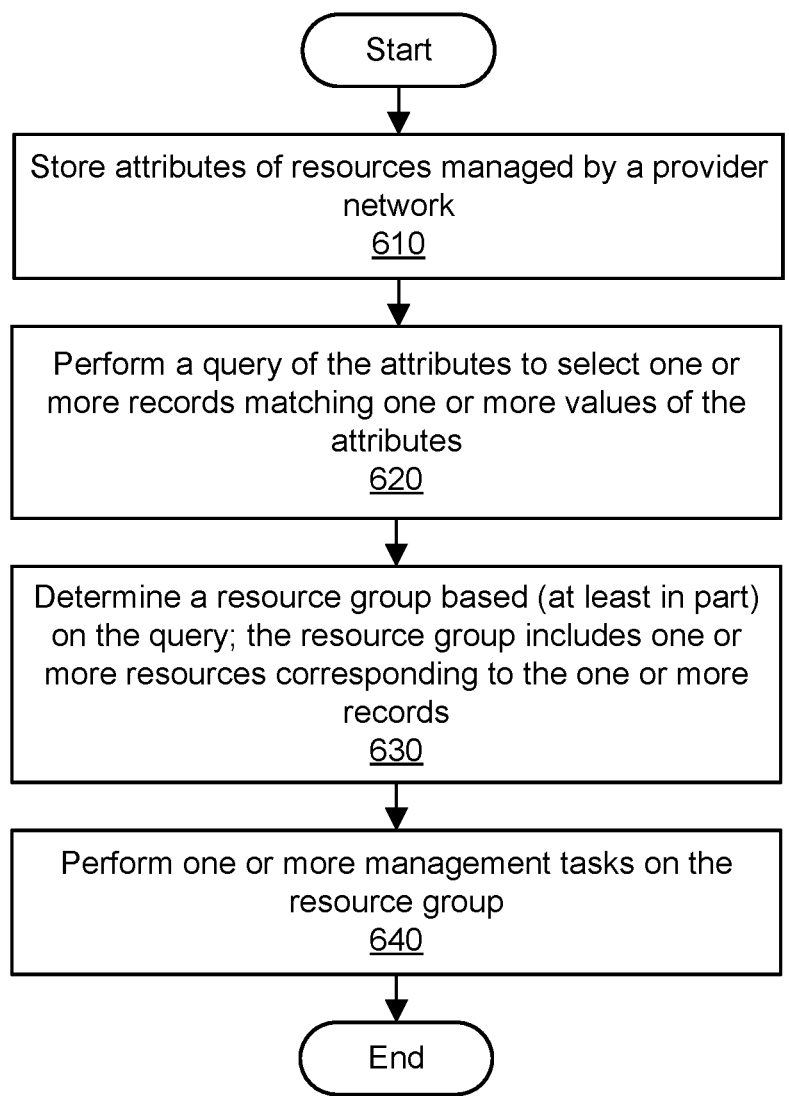
FIG. 6 is a flowchart illustrating a method for using a query language for selecting and addressing resources, according to one embodiment.

FIG. 6 is a flowchart illustrating a method for using a query language for selecting and addressing resources, according to one embodiment. In one embodiment, as shown in 610, attributes of resources may be stored in a data store. In one embodiment, the resources may represent various types of resources hosted and/or managed by a provider network, such as compute instances, storage resources, and so on. In one embodiment, the attributes may be descriptive of the resources and may be stored using records in the data store. In various embodiments, the attribute data may be obtained from a crawler service that scans periodically and/or from event-driven notifications generated within the provider network.

In one embodiment, as shown in 620, a query of the attributes may be performed. In one embodiment, the query may represent various search criteria with respect to the resource attributes and may be expressed in a query language. In one embodiment, the query language may represent a standardized way to group the resources of the provider network. In one embodiment, using the query language, a user may specify, as search criteria, one or more user-defined attributes and/or system-defined attributes that collectively define the membership of a resource group. In one embodiment, user-defined attributes may include tags or other human-readable labels that are applied to resources by users. In one embodiment, system-defined attributes may include resource types, resource identifiers, regions or subdivisions within the provider network, hardware configurations, software configurations, status information, health information, or other dynamic resource attributes that may change without user input. In one embodiment, the query may select one or more records matching one or more values of the attribute data.

In one embodiment, as shown in 630, a resource group may be determined based (at least in part) on the query. In one embodiment, the resource group comprises one or more resources corresponding to the one or more records selected by the query. In one embodiment, the results 127 of a query may include a list of resource identifiers in a structured format, e.g., according to JavaScript Object Notation (JSON); the resulting resource group may include these resource identifiers. In one embodiment, as shown in 640, one or more management tasks may be performed on the resource group. In one embodiment, the one or more management tasks configure the one or more resources in the resource group.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting

[the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a plurality of resources having different resource types and implemented by a plurality of computing devices for a plurality of different types of services of a multi-tenant provider network, wherein the plurality of resources includes resources for a plurality of different clients of the multi-tenant provider network;
    a data store;
    one or more processors and memory to store computer-executable instructions that, when executed, cause the one or more processors to:
        store, in the data store, a plurality of records comprising attribute data descriptive of the resources having different resource types and implemented by the computing devices provided by the multi-tenant provider network, wherein the attribute data descriptive of the resources comprise one or more user-defined attributes and system-defined attributes, wherein the system-defined attributes comprise one or more attributes defined or changed within the multi-tenant provider network without user input;
        perform, for a given client of the plurality of clients, a query of the plurality of records in the data store which comprises the attribute data descriptive of the resources of the multi-tenant provider network, wherein performing the query comprises searching the data store having the attribute data to select, from among the plurality of records in the data store, records having attribute data matching one or more values of attribute data expressed in the query using a query language, wherein the query language supports querying based on the one or more user-defined attributes and system-defined attributes for resources having different resource types implemented by the plurality of different types of services of the multi-tenant provider network;
        determine a resource group based at least in part on a result of the query of the plurality of records in the data store, wherein the resource group comprises resources corresponding to the records selected by the query, and wherein the resource group is one of a plurality of resource groups for the given client; and
        perform one or more management tasks on the resource group of the plurality of resource groups for the given client, wherein the one or more management tasks configure one or more resources in the resource group.

2. The system of claim 1, wherein the plurality of resources comprises at least one of: a physical compute instance, a virtual compute instance, a physical storage instance, a virtualized storage instance, a physical networking instance, or a virtualized networking instance.

3. The system of claim 1, wherein the plurality of different types of services comprises at least one of: a compute virtualization service, or a storage virtualization service.

4. The system of claim 1, wherein the user-defined attributes comprise one or more tags or human-readable labels.

5. The system of claim 1, wherein the system-defined attributes comprise at least one of: an attribute representing a resource type, an attribute representing a resource identifier, an attribute representing a region or subdivision within the multi-tenant provider network, an attribute representing a physical or geographical location, an attribute representing a hardware configuration, an attribute representing a software configuration, an attribute representing status information, an attribute representing health information, or an attribute representing a resource usage metric.

6. The system of claim 1, wherein the one or more management tasks are selected from a menu of tasks based at least in part on user input, and wherein the menu of tasks is generated based at least in part on one or more types of resources in the resource group.

7. The system of claim 1, wherein the computer-executable instructions further cause the one or more processors to:
    obtain at least some of the attribute data using a crawler service that scans the provider network periodically.

8. A method, comprising:
    storing, in a data store, a plurality of records comprising attribute data descriptive of a plurality of resources having different resource types and implemented by a plurality of computing devices for a plurality of different types of services of a multi-tenant provider network, wherein the attribute data descriptive of the resources comprise one or more user-defined attributes and system-defined attributes, wherein the system-defined attributes comprise one or more attributes defined or changed within the multi-tenant provider network without user input;
    performing, for a given client of the plurality of clients, a query of the plurality of records in the data store which comprises the attribute data descriptive of the resources of the multi-tenant provider network, wherein performing the query comprises searching the data store having the attribute data to select, from among the plurality of records in the data store, records having attribute data matching one or more values of attribute data expressed in the query using a query language, wherein the query language supports querying based on the one or more user-defined attributes and system-defined attributes for resources having different resource types implemented by the plurality of different types of services or the multi-tenant provider network;
    determining a resource group based at least in part on a result of the query of the plurality of records in the data store, wherein the resource group comprises resources corresponding to the records selected by the query, and wherein the resource group is one of a plurality of resource groups for the given client; and performing one or more management tasks on the resource group of the plurality of resource groups for the given client, wherein the one or more management tasks configure one or more resources in the resource group.

9. The method of claim 8, wherein the plurality of resources comprises at least one of: a physical compute instance, a virtual compute instance, a physical storage instance, a virtualized storage instance, a physical networking instance, or a virtualized networking instance.

10. The method of claim 8, wherein the plurality of different types of services comprises at least one of: a compute virtualization service, or a storage virtualization service.

11. The method of claim 8, wherein the user-defined attributes comprise one or more tags or human-readable labels.

12. The method of claim 8, wherein the system-defined attributes comprise at least one of: an attribute representing a resource type, an attribute representing a resource identifier, an attribute representing a region or subdivision within the multi-tenant provider network, an attribute representing a physical or geographical location, an attribute representing a hardware configuration, an attribute representing a software configuration, an attribute representing status information, an attribute representing health information, or an attribute representing a resource usage metric.

13. The method of claim 8, wherein the one or more management tasks are selected from a menu of tasks based at least in part on user input, and wherein the menu of tasks is generated based at least in part on one or more types of resources in the resource group.

14. The method of claim 8, further comprising:
obtaining at least some of the attribute data using a crawler service that scans the provider network periodically.

15. One or more non-transitory computer-readable storage media storing program instructions that, when executed on or across one or more processors, cause the one or more processors to:
store, in a data store, a plurality of records comprising attribute data descriptive of a plurality of resources having different resource types and implemented by a plurality of computing devices for a plurality of different types of services of a multi-tenant provider network, wherein the attribute data descriptive of the resources comprise one or more user-defined attributes and system-defined attributes, wherein the system-defined attributes comprise one or more attributes defined or changed within the multi-tenant provider network without user input;

perform, for a given client of the plurality of clients, a query of the plurality of records in the data store which comprises the attribute data descriptive of the resources of the multi-tenant provider network, wherein performing the query comprises searching the data store having the attribute data to select, from among the plurality of records in the data store, records having attribute data matching one or more values of attribute data expressed in the query using a query language, wherein the query language supports querying based on the one or more user-defined attributes and system-defined attributes for resources having different resource types implemented by the plurality of different types of services of the multi-tenant provider network;

determine a resource group based at least in part on a result of the query of the plurality of records in the data store, wherein the resource group comprises resources corresponding to the records selected by the query, and wherein the resource group is one of a plurality of resource groups for the given client; and perform one or more management tasks on the resource group of the plurality of resource groups for the given client, wherein the one or more management tasks configure one or more resources in the resource group.

16. The non-transitory computer-readable storage media of claim 15, wherein the plurality of resources comprises at least one of: a physical compute instance, a virtual compute instance, a physical storage instance, a virtualized storage instance, a physical networking instance, or a virtualized networking instance.

17. The non-transitory computer-readable storage media of claim 15, wherein the plurality of different types of services comprises at least one of: a compute virtualization service, or a storage virtualization service.

18. The non-transitory computer-readable storage media of claim 15, wherein the user-defined attributes comprise one or more tags or human-readable labels.

19. The non-transitory computer-readable storage media of claim 15, wherein the system-defined attributes comprise at least one of: an attribute representing a resource type, an attribute representing a resource identifier, an attribute representing a region or subdivision within the multi-tenant provider network, an attribute representing a physical or geographical location, an attribute representing a hardware configuration, an attribute representing a software configuration, an attribute representing status information, an attribute representing health information, or an attribute representing a resource usage metric.

20. The non-transitory computer-readable storage media of claim 15, wherein the program instructions further cause the one or more processors to:
obtain at least some of the attribute data using a crawler service that scans the provider network periodically.

* * * * *